(12) United States Patent
Hartmann (10) Patent No.: US 10,274,113 B2
(45) Date of Patent: Apr. 30, 2019

(54) SEAL (71) Applicant: Henn GmbH & Co KG., Dornbirn (AT)

(72) Inventor: Harald Hartmann, Dornbirn (AT)

(73) Assignee: Henn GmbH & Co KG., Dornbirn (AT)

( * ) Notice: Subject to any disclaimer, the term of this patent is extended or adjusted under 35 U.S.C. 154(b) by 214 days.

(21) Appl. No.: 15/123,332

(22) PCT Filed: Mar. 3, 2015

(86) PCT No.: PCT/AT2015/050054
§ 371 (c)(1),
(2) Date: Sep. 2, 2016

(87) PCT Pub. No.: WO2015/131213
PCT Pub. Date: Sep. 11, 2015

(65) Prior Publication Data
US 2017/0074430 A1 Mar. 16, 2017

(30) Foreign Application Priority Data
Mar. 3, 2014 (AT) .................. GM50031/2014 U (51) Int. Cl.
*F16L 17/035* (2006.01)
*F16J 15/3236* (2016.01)
*F16J 15/02* (2006.01)

(52) U.S. Cl.
CPC ........... *F16L 17/035* (2013.01); *F16J 15/025* (2013.01); *F16J 15/3236* (2013.01); *Y10T 29/49826* (2015.01)

(58) Field of Classification Search
CPC ..... F16L 17/035; F16J 15/025; F16J 15/3236; Y10T 29/49826

(Continued)

(56) References Cited

U.S. PATENT DOCUMENTS 2,398,399 A * 4/1946 Alexander ............ F16L 17/035
277/626 X
2,808,275 A 10/1957 Sherman
(Continued)

FOREIGN PATENT DOCUMENTS

AT 12 491 U1 6/2012
CN 1904455 A 1/2007
(Continued)

OTHER PUBLICATIONS

International Search Report of PCT/AT2015/050054, dated Jul. 22, 2015.

*Primary Examiner* — Greg Binda
*Assistant Examiner* — Zachary T Dragicevich
(74) *Attorney, Agent, or Firm* — Collard & Roe, P.C.

(57) ABSTRACT

A seal includes a first sealing lip having a first sealing surface for contacting a first component and at least one other sealing lip having at least one other sealing surface for contacting at least one other component. The sealing lips are connected to one another in a lip base region of the seal and are each freely protruding at the end thereof which is opposite the lip base region and on which the sealing surfaces are arranged. On sides thereof opposite the sealing surface, each has a contact surface. The contact surfaces are spaced apart from one another in the relaxed base position. The seal has a working position provided for sealing the components in which the sealing lips lie supported against one another via the contact surfaces thereof. The other sealing lip has a sealing-lip wing which, in a working position of the seal, forms a pressure surface to which pressure can be applied radially.

13 Claims, 4 Drawing Sheets

(58) Field of Classification Search
USPC ........ 285/111, 910, 918; 277/566, 625, 626, 277/647
See application file for complete search history.

(56) References Cited

U.S. PATENT DOCUMENTS

| | | | | |
|---|---|---|---|---|
| 3,390,890 | A | * | 7/1968 | Kurtz ................... F16L 17/035 |
| | | | | 277/625 |
| 5,213,339 | A | * | 5/1993 | Walworth ............. F16L 17/035 |
| | | | | 285/111 X |
| 5,944,323 | A | * | 8/1999 | Cavka ................... F16J 15/025 |
| | | | | 277/626 |
| 7,686,345 | B2 | | 3/2010 | Hartmann |
| 2009/0146419 | A1 | | 6/2009 | Gustafsson |
| 2011/0084478 | A1 | | 4/2011 | Holmes, IV et al. |

FOREIGN PATENT DOCUMENTS

| | | |
|---|---|---|
| CN | 101988580 A | 3/2011 |
| DE | 25 45 830 A1 | 4/1977 |
| DE | 10 2013 200 986 A1 | 8/2013 |
| DE | 11 2012 000 747 A5 | 11/2013 |
| JP | S53-013629 U | 2/1978 |
| JP | H05-014778 U | 2/1993 |
| JP | 2002-147614 A | 5/2002 |
| JP | 2010-255698 A | 11/2010 |
| SU | 1499033 A1 | 8/1989 |
| WO | 2006/037967 A1 | 4/2006 |
| WO | 2007/123459 A1 | 11/2007 |
| WO | 2009/094679 A1 | 8/2009 |
| WO | 2012/107015 A2 | 8/2012 |

\* cited by examiner

Fig.4

SEAL

CROSS REFERENCE TO RELATED APPLICATIONS

This application is the National Stage of PCT/AT2015/050054 filed on Mar. 3, 2015, which claims priority under 35 U.S.C. § 119 of Austrian Application No. GM 50031/2014 filed on Mar. 3, 2014, the disclosure of which is incorporated by reference. The international application under PCT article 21(2) was not published in English.

BACKGROUND OF THE INVENTION

1. Field of the Invention

The invention relates to a seal, in particular an annular seal.

2. Description of the Related Art

AT 12 491 U1 discloses a seal, in particular an annular seal, comprising a first sealing lip having a first sealing surface for contacting a first, in particular tubular, component and at least one other sealing lip having at least one other sealing surface for contacting at least one other, in particular tubular, component, the sealing lips being connected to one another in a lip base region of the seal and each freely protruding at the end thereof opposite the lip base region and each having a contact surface respectively at their ends opposite their sealing surface, and in a relaxed base position of the seal there is a gap between the first sealing lip and the other sealing lip outside the lip base region so that the contact surfaces are spaced apart from one another in the relaxed base position, and the seal has a working position provided for sealing the components in which the sealing lips lie supported against one another by their contact surfaces. The essential feature is that the first sealing lip and the other sealing lip have a thickness which increases continuously from the lip base region in the direction towards the respective freely protruding end.

The disadvantage of the design described in AT 12 491 U1 is that the seal can only be activated by the medium pressure occurring at the end face of the sealing lip under certain circumstances because of its design.

SUMMARY OF THE INVENTION

The underlying objective of this invention is to propose a seal which has the advantages of a seal as described in AT 12 491 U1 and the sealing effect thereof can be further increased by medium pressure acting on the sealing lip.

This objective is achieved by the invention on the basis of the features described herein.

The invention proposes a seal, in particular an annular seal, comprising a first sealing lip having a first sealing surface for contacting a first, in particular tubular, component and at least one other sealing lip having at least one other sealing surface for contacting at least one other, in particular tubular, component. The sealing lips are connected to one another in a lip base region of the seal and protrude freely at their end opposite the lip base region on which the sealing surfaces are disposed. On their sides opposite their sealing surface, they each have a contact surface. In a relaxed base position of the seal, a gap is provided between the first sealing lip and the other sealing lip outside the lip base region so that the contact surfaces are spaced apart from one another in the relaxed base position. The seal has a working position provided for sealing the components in which the sealing lips lie supported against one another by their contact surfaces, and the first sealing lip and the other sealing lip have a continuously increasing thickness from the lip base region in the direction towards the respective freely protruding end. The other sealing lip has a sealing-lip wing which, in a working position of the seal, forms a pressure surface to which pressure can be applied radially.

One advantage of the design proposed by the invention resides in the fact that, other than in the lip base region where they are connected, the sealing lips are spaced apart from one another in the relaxed base position and during fitting can initially be moved towards one another with only slight fitting forces and it is not until they are in or shortly before they are in the working position with their contact surfaces lying in contact with one another that they are then supported against one another in the working position. A seal such as that proposed by the invention offers all the advantages required of it. Due to the gap initially provided between the sealing lips, the components to be connected to one another can initially be connected to one another by applying relatively little force. It is not until the contact surfaces of the sealing lips come into contact with one another that the intrinsic preload of the seal significantly increases, which leads to a high degree of biasing force or pressing force in the working position. Furthermore, with such seals, relatively large manufacturing tolerances of the components to be connected to one another can also be compensated. Especially in the case of a seal provided with a sealing-lip wing that is placed under pressure, the surprising major advantage compared with the known seal designs is that an increased internal pressure between the tube segments to be sealed with respect to one another results in an improved sealing action. This comes as a result of a higher pressing force of the sealing-lip wings on the internally lying component. This improves the sealing effect of the seal whilst still offering all the advantages described above. This surprising and seemingly contradictory effect of ease of fitting due to a flexible seal shape combined with a very good sealing action of the seal can only be achieved due to the design of the sealing-lip wing proposed by the invention.

It may also be of practical advantage if, in the working position, a residual space is provided between the sealing lips in the region between the lip base region and the mutually abutting contact surfaces. The advantage of this is that the region in which the contact surfaces lie against one another and thus transmit a sealing force to the sealing lips can be specifically set by constructive means. This enables the sealing effect to be increased because the sealing effect is obtained in an exactly defined circumferential region of the seal.

Furthermore, the contact surfaces may be disposed in a region of the first sealing lip and the other sealing lip spaced at a distance apart from the lip base region. The advantage of this is that by specifically setting the distance on the basis of constructive means, the biasing force and hence sealing effect can be influenced. For example, if the distance is bigger, the biasing force which can be achieved by the lip base region is lower.

Furthermore, the sealing surfaces of the first sealing lip and the other sealing lip are disposed at an angle of less than 90°, preferably less than 70°, relative to one another in the relaxed base position as viewed in cross-section. The advantage of this is that a base position in the specified range of values makes it easier to join the two pipe segments to be sealed.

Also of advantage is a feature whereby the seal has at least one dirt lip, preferably two dirt lips, on the side of the lip base region opposite the first sealing lip and the other sealing lip. The advantage of a seal design with dirt lips is that the sealing surfaces, in particular those surfaces on which the seal lies against the pipe segments to be sealed, are protected from dirt. This means that the seal will continue to provide an effective seal for as long as possible.

Based on another embodiment, the first sealing lip and/or the other sealing lip and/or the lip base region and/or the optionally provided dirt lip(s) and/or the sealing-lip wing is or are of an elastically deformable design, at least in some regions but preferably entirely. The advantage of this is that the sealing lip is able to adapt to the pipe segments to be sealed, thereby resulting in an effective seal.

It may also be expedient if the sealing-lip wing is created by providing a recess in an end region of the other sealing lip. The advantage of this is that the other sealing lip may have a high stability and the sealing-lip wing is obtained by providing a simple recess.

Alternatively, the sealing-lip wing may be created by the fact that it protrudes from an end region of the other sealing lip. The advantage of an embodiment based on this design of sealing lip is that it is easy to manufacture.

Furthermore, in the working position, both sealing lips may be designed so that they protrude from the mutually abutting contact surfaces thereof. The advantage of this is that both in the case where the pipe segment lies inside and the pipe segment lies outside, an improved sealing effect can be achieved because an increase in the pressure in the interior of the pipes to be sealed leads to an increase in the contact pressure.

In addition, in the working position, a pressurizing space is provided between the sealing lips in the region of the freely protruding ends spaced at a distance apart from the lip base region outside the mutually abutting contact surfaces. The advantage of this is that the sealing lips can be pressure activated by the pressurizing space so that the sealing effect can be improved when an internal pressure is applied between the two pipes to be sealed.

Based on another advantageous embodiment, the thickness of the first sealing lip continuously decreases again in the outermost end region of the freely protruding end. The advantage of this is that a pressure activated seal of the first sealing lip can be achieved.

Also of advantage is a method for sealing a first, in particular tubular, component to at least one other, in particular tubular, component by means of a seal in a connecting position in which the first component is fully connected to the other component with the seal connected in between. A seal as described herein is inserted in one tubular component and then another tubular component is pushed into the seal, and during the fitting operation the seal is transferred from a relaxed base position into a working position. The particular advantage of this is that the use of said seal makes it easier to join the individual tubular components.

BRIEF DESCRIPTION OF THE DRAWINGS

To provide a clearer understanding, the invention will be described in more detail below with reference to the appended drawings.

These are highly simplified, schematic diagrams illustrating the following.

DETAILED DESCRIPTION OF THE INVENTION

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Figure 1:
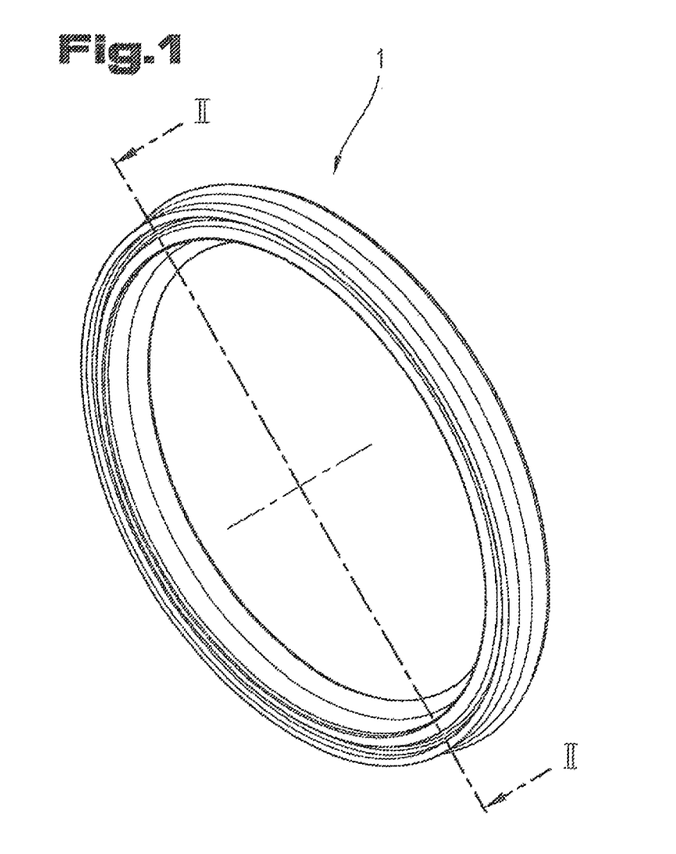
FIG. 1 a plan view of a seal proposed by the invention.

FIG. 1 is a plan view illustrating a first example of an embodiment of a non-assembled seal 1 in the form of a sealing ring. Before explaining in detail the examples illustrating embodiments, it should be pointed out that the seal 1 proposed by the invention need not necessarily be annular and instead can be adapted to the shape of the components to be connected to one another and sealed.

Figure 2:
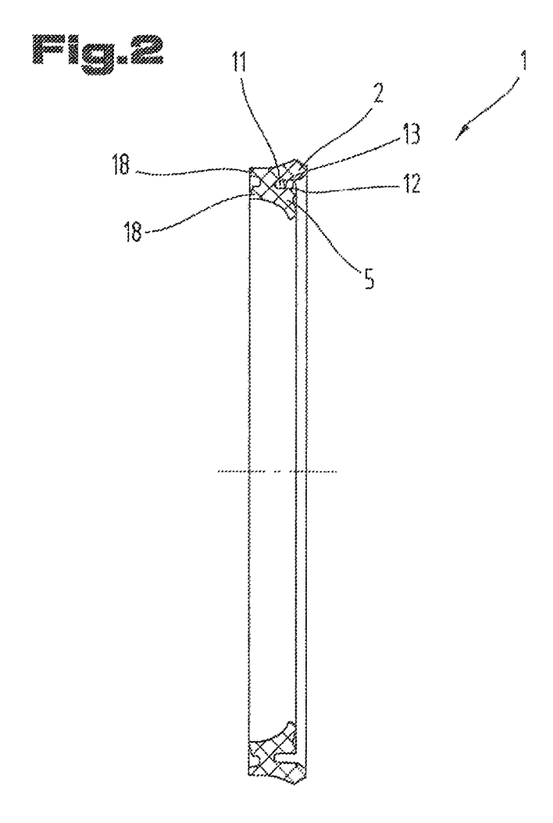
FIG. 2 a section through the seal, in particular along section line II-II indicated in FIG. 1.
Figure 3:
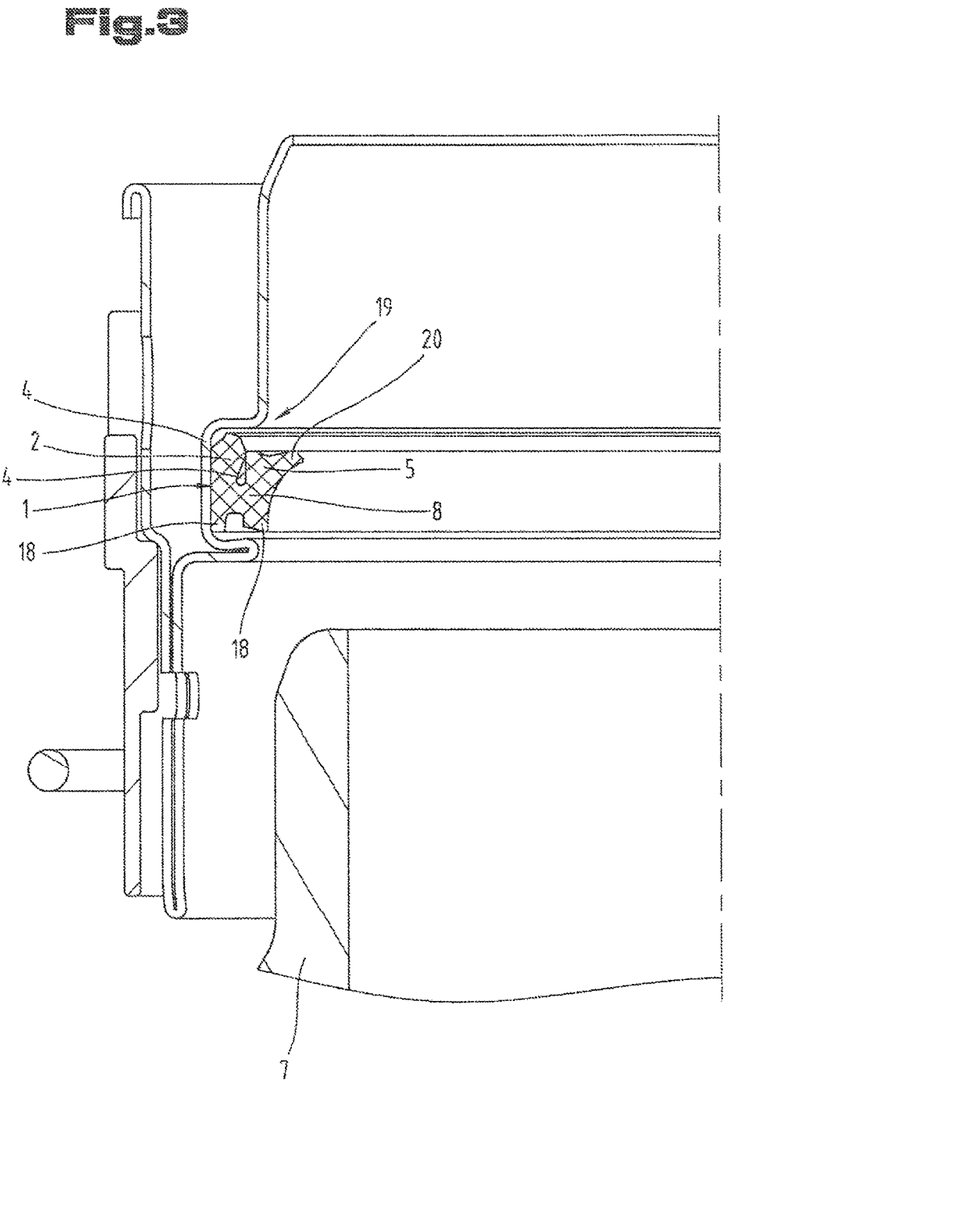
FIG. 3 a similar section through a seal inserted in an externally lying pipe segment.
Figure 4:
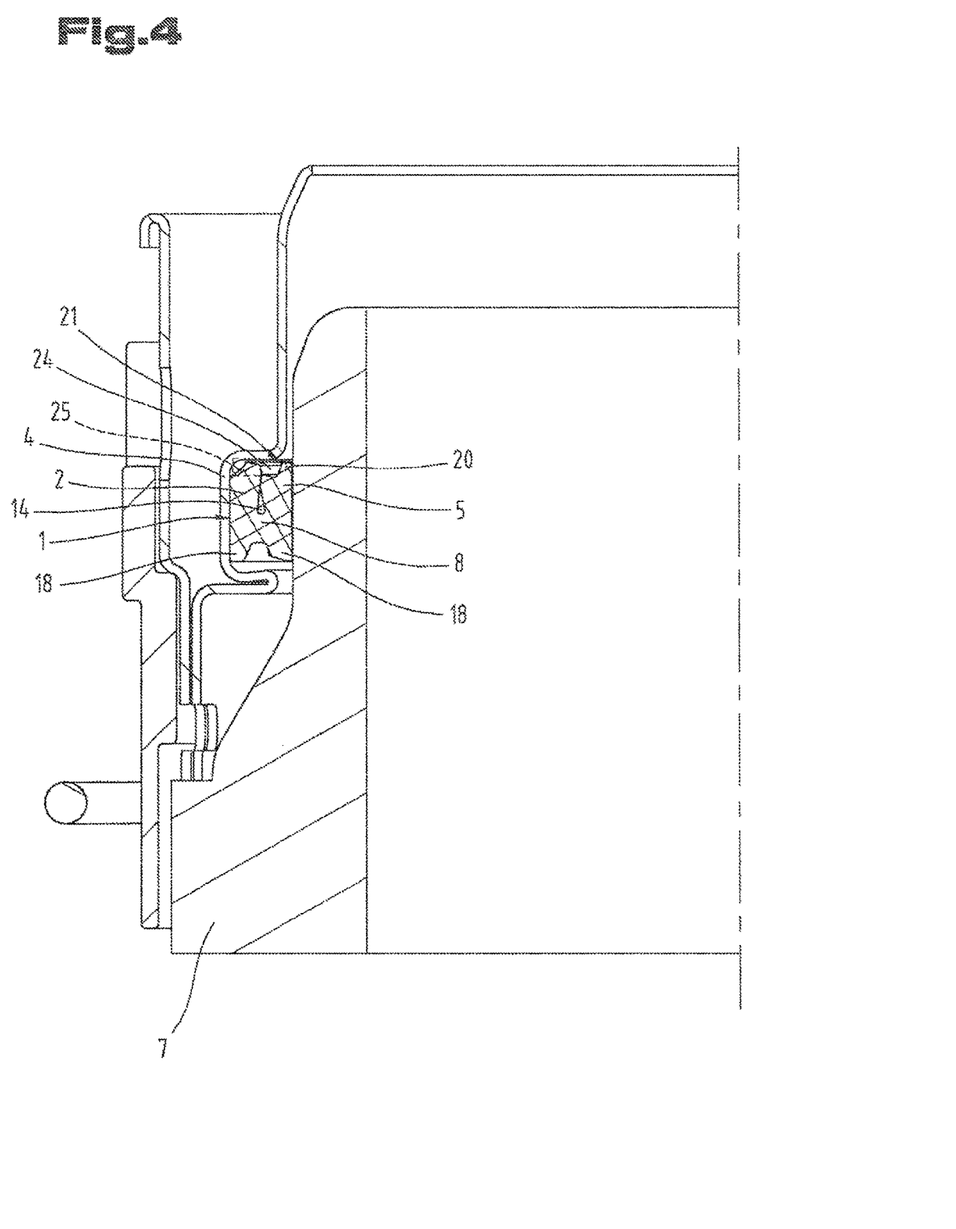
FIG. 4 a similar section through a fully assembled seal.

FIG. 2 is a section along section line II-II indicated in FIG. 1. It should be noted in particular that the cross-sections of a first embodiment of a seal 1 may be seen at the top and bottom in FIG. 2 as well as in the diagram of the cross-section of this embodiment on a larger scale in FIG. 5. The arrangements illustrated in FIG. 3 and FIG. 4 are also based on this first embodiment of the seal 1. Another embodiment of the seal 1 is illustrated in FIG. 6.

Figure 5:
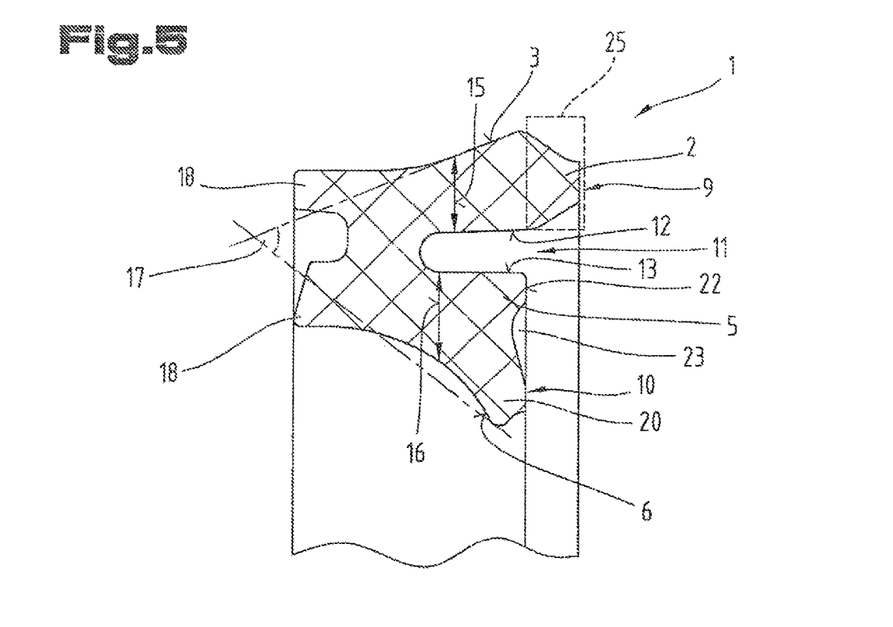
FIG. 5 a cross-section of a first embodiment of a seal contour proposed by the invention.
Figure 6:
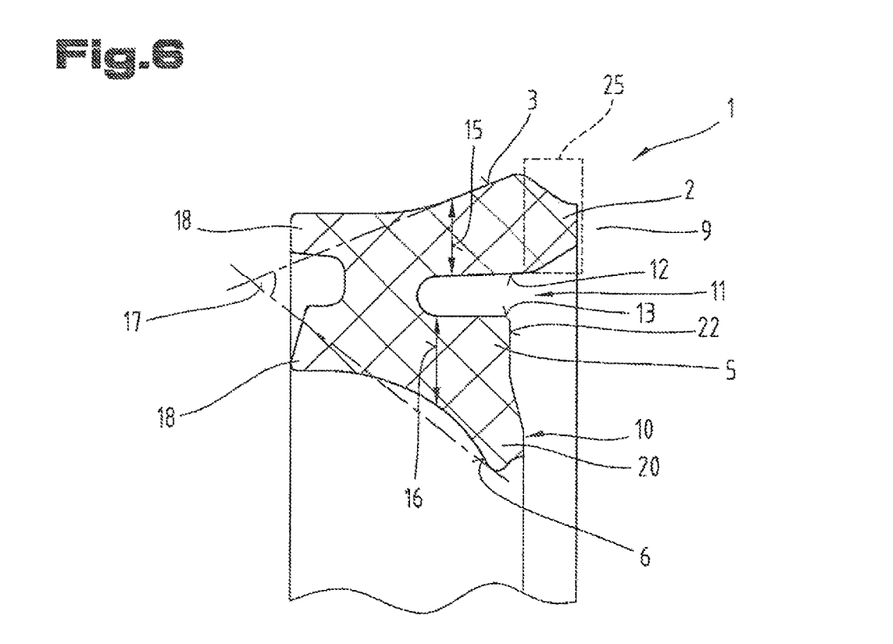
FIG. 6 a cross-section of a second embodiment of a seal contour proposed by the invention.

As may be seen from FIG. 2 and more particularly FIG. 5 illustrating this cross-section on a larger scale, the seal 1 comprises a first sealing lip 2 and another sealing lip 5 which are connected to one another in the lip base region 8. In FIG. 2, the seal 1 is illustrated in its relaxed base position, in which a gap 11 is formed between the two sealing lips 2 and 5. The gap 11 is open towards the outside on the side remote from the lip base region 8.

The ends 9 and 10 of the two sealing lips 2 and 5 opposite the lip base region 8 each protrude freely outwards. On their sides facing away from one another, each of the sealing lips 2 and 5 has a respective sealing surface 3 and 6. These sealing surfaces 3 and 6 are respectively provided as a means of contacting and sealing one of the components to be connected to one another 4 and 7. On the sides respectively lying opposite the sealing surfaces 3 and 6, in other words pointing towards the gap 11, each sealing lip 2 and 5 has a contact surface 12 and 13. By means of the contact surfaces 12 and 13, the sealing lips 2 and 5 lie supported against one another when the seal is disposed in its working position in which it connects the components 4 and 7 to one another and seals them. An example of this is illustrated in FIG. 4.

As may also be clearly seen in FIG. 2, the thickness of the sealing lips 2 and 5 increases from the lip base region 8 in the direction towards the ends 9 and 10.

As may also be seen, the seal 1 has a dirt lip 18 on the side of the lip base region 8 remote from the sealing lips 2 and 5 respectively. These dirt lips 18 are known per se, their purpose being to prevent dirt from outside getting into the region of the sealing surfaces 3 and 6.

FIG. 3 illustrates two components to be connected to one another 4 and 7, the seal 1 being provided for the purpose of sealing these two components 4 and 7 to one another when in the connecting position illustrated m FIG. 4.

In FIG. 3, the components 4 and 7 are still disposed in a released position and the seal 1 is in its relaxed base position. The two components 4 and 7 to be connected to one another and mutually sealed are tubular in the example of an embodiment illustrated here. Specifically, component 4 is a bush and component 7 is a co-operating male counterpart of a push-fit pipe connection. The bush 4 in this example of an embodiment is a part made from sheet metal. It has a groove 19 in which the seal 1 sits.

Such a groove 19 secures the seal 1 in its position when the other component 7 in the form of a male counterpart is pushed into the first component 4. The position is secured because the seal 1 is received in the groove 19 in a positively fitting arrangement.

In the released position illustrated in FIG. 3, the seal 1 sits with its first sealing surface 3 of the first sealing lip 2 on the first component 4 already, whereas the other sealing lip 5 has not yet deformed because component 7 has not yet been fitted. Sealing lip 2 in this arrangement has already been deformed by component 4, respectively the groove 19 in component 4, to the degree that the gap 11 which exists between the two sealing lips 2, 5 when the seal 1 is in the fully relaxed state has now been pushed together or at least almost pushed together so that the sealing lips 2, 5 lie almost or completely one against the other at the contact surfaces 12, 13. It may be that the sealing lips 2, 5 are not pressed one against the other across the entire length but rather only in a small part-region of the contact surfaces so that instead of the gap 11, only a residual space 14 is left.

When the seal 1 is being fitted in component 4, in particular in the groove 19, the seal 1 is deformed and compressed again to the degree that the round circumferential shape is compressed and made smaller to the extent that the seal 1 can be inserted in the groove 19. At the end of this fitting operation, the seal 1 is able to relax in the groove 19 again and deforms back more or less to its fully relaxed initial state. The sealing lip 2 remains slightly deformed at this stage and sits with its first sealing surface 3 snugly against component 4 so that the latter is in contact with the seal 1, in particular with sealing surface 3, around the entire circumference. The force needed to enable the sealing surface 3 to be pressed against the component 4 is effectively the intrinsic tension in the seal 1 induced by the deformation.

FIG. 4 illustrates the seal 1 in its working position in which the two components 4 and 7 are connected to one another with the seal 1 connected in between. As the second component 7 is pushed into the first component 4, the other sealing lip 5 is forced by the second component 7 from the position illustrated in FIG. 3 in the direction towards the first sealing lip 2. Due to the only slight deformation, only light fitting forces are needed to join components 4, 7 at the start of the fitting operation.

Due to the movement of sealing lips 2 and 5 towards one another, the contact surfaces 12 and 13 of the two sealing lips 2 and 5 move further towards one another until they lie in contact with one another. The gap 11 is made correspondingly narrower during this movement and is closed during this joining operation until only the residual space 14 remains. As soon as the two sealing lips 2 and 5 lie in contact with one another by their contact surfaces 12 and 13, they are supported one against the other. Due to the fact that the sealing lips 2, 5 are supported against one another, deformation of the seal 1 is counteracted by a greater resistance, as a result of which significantly stronger pressing forces are applied between the seal 1 and the components 4, 7.

During the process of joining the two components 4, 7, the other sealing lip 5 is further deformed, in particular causing a sealing-lip wing 20 to deform due to the elasticity of the other sealing lip 5.

At the end of the process of joining the components 4, 7, the seal 1 has completely deformed and has thus reached its working position, which is illustrated in FIG. 4.

In the working position, the second sealing lip 5, respectively the sealing-lip wing 20, has deformed to the degree that a pressure surface 21 is formed on the side facing the first sealing lip 2. The sealing-lip wing 20 thus forms a region which stands out from the body of the other sealing lip 5, which sits in contact with the first sealing lip 2.

In the working position, the pressure surface 21 is oriented so that it has an axial extension. When an increase in the internal pressure between the two components to be sealed 4,7, causes an increase in the pressure on the pressure surface 21, a normal force acts on the latter due to the pressure on the pressure surface 21. Due to the normal force acting on the pressure surface 21, the sealing-lip wing 20 is pressed against the component 7 to be sealed, thereby improving the sealing effect. It may be that a sealing-lip wing 20 is provided on only the other sealing lip 5.

In addition, an end region 25 may be provided on the first sealing lip 2, which has the same effect as the sealing-lip wing 20 when in the fitted state. In other words, this end region 25 may also be designed so that when there is an increase in the internal pressure, pressure is applied to an internally lying surface of the end region 25, thereby creating a normal force on the pressure surface, as a result of which the end region is pressed against the component 4. Based on this design of seal 1, a pressurizing space 24 is formed in the fitted state, i.e. in the working position, which is designed to enable the pressure surfaces described above to be formed and the mechanisms described above to be obtained.

As may also be clearly seen from FIG. 4, even when the seal 1 is in the working position, a residual space 14 is left free between sealing lips 2 and 5 between the lip base region 8 and the mutually abutting contact surfaces 12 and 13, based on preferred embodiments.

FIG. 5 is a cross-section of the example of an embodiment of the seal 1 illustrated in FIG. 2 but on a larger scale. The angle 17 subtended by sealing surfaces 3 and 6 of the sealing lips 2 and 5 can be seen particularly clearly. This angle 17 should preferably be at least less than 90°, preferably less than 70°. In this particular case, it is ca. 60°.

Also indicated in this enlarged diagram is the thickness 15 of the first sealing lip 2 and the thickness 16 of the second sealing lip 5 at more or less any selected point. In preferred embodiments of the seal 1 proposed by the invention, the thickness 15 and/or 16 of the first sealing lip 2 and/or the other sealing lip 5 preferably increases continuously from the lip base region 8 in the direction towards the respective freely protruding end 9 respectively 10, at least in certain regions. In the example of an embodiment illustrated in FIGS. 2 and 5, thickness 15 of sealing lip 2 as well as the thickness 16 of sealing lip 5 increases continuously in this direction. However, the sealing lips 2, 5 may have an end region 25 and/or a sealing-lip wing 20 in which the thickness 15 and 16 no longer increases but is such that the sealing effects described above are obtained in the working position.

In this case, the other sealing lip 5 has a sealing lip wing 20. The lip wing is a region at the end 10 of the sealing lip which protrudes somewhat from the main body of the other sealing lip 5. As a result of this protruding design, the lip wing 20 is able to deform slightly and forms the described lip wing 20 with the pressure surface 21 in the fitted or working position. In order to achieve these effects, a recess 23 may be provided on the end 10, more specifically in an end face 22 of the other sealing lip 5, by means of which the lip wing 20 is created and by means of which the effects described above can be achieved.

The first sealing lip 2 may be provided with a continuously decreasing thickness 15 in an end region 25 so that the described effects can also be achieved in this instance. Furthermore, as viewed in the axial direction, the end region 25 may be designed so that it protrudes from the end face 22. As a result, in particular, the sealing effects of the first sealing lip 2 can be achieved because a portion protruding from the end face 22 is also created when the seal 1 is in the working position so that a pressure surface is formed which produces the effects and advantages described above.

FIG. 6 illustrates another embodiment of the seal 1, which may also be construed as an independent embodiment, the same reference numbers and component names being used to denote parts that are the same as those described in connection with FIGS. 1 to 5 above. In the case of this embodiment, the end face 22 of the other sealing lip 5 is disposed closer to the lip base region 8 than is the case with the embodiment illustrated in FIG. 5. As a result, there is no need to provide a recess 23 in order to form the sealing-lip wing 20, and instead the latter is obtained due to the fact that it protrudes from the end face 22. The function of the sealing-lip wings and the shape in the fitted state are the same as those of the embodiment described with reference to FIGS. 1 to 5 and for the sake of brevity will not be described separately again here.

The embodiments illustrated as examples represent possible variants of the sealing lip, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

The objective underlying the independent inventive solutions may be found in the description.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

Above all, the individual embodiments of the subject matter illustrated in FIGS. 1 to 5 and 6 constitute independent solutions proposed by the invention in their own right. The objectives and associated solutions proposed by the invention may be found in the detailed descriptions of these drawings.

For the sake of good order, finally, it should be pointed out that, in order to provide a clearer understanding of the structure of the seal 1, it and its constituent parts are illustrated to a certain extent out of scale and/or on an enlarged scale and/or on a reduced scale.

LIST OF REFERENCE NUMBERS

1 Seal
2 First sealing lip
3 First sealing surface
4 First component
5 Other sealing lip
6 Other sealing surface
7 Other component
8 Lip base region
9 End
10 End
11 Gap
12 Contact surface
13 Contact surface
14 Residual space
15 Thickness
16 Thickness
17 Angle
18 Dirt lip
19 Groove
20 Sealing-lip wing
21 Pressure surface
22 End face
23 Recess
24 Pressurizing space
25 End region

The invention claimed is:
1. A seal, which comprises:
(a) a lip base region;
(b) a first sealing lip arranged on the lip base region, having a first end opposite the lip base region, having a first sealing surface arranged on a first side of the first sealing lip for contacting a first component, and having a first mutually abutting contact surface arranged on a second side of the first sealing lip opposite the first side of the first sealing lip; and
(c) a second sealing lip arranged on the lip base region, having a second end opposite the lip base region, having a second sealing surface arranged on a second side of the second sealing lip for contacting a second component, and having a second mutually abutting contact surface arranged on a first side of the second sealing lip opposite the first side of the second sealing lip and adjacent to the first mutually abutting contact surface of the first sealing lip; and
wherein the first and second sealing lips are connected to one another in the lip base region and freely protrude at the first and second ends respectively;
wherein when the seal is in a relaxed base position a gap is disposed between the first sealing lip and the second sealing lip outside the lip base region so that the first and second contact surfaces are spaced apart from one another in the relaxed base position;
wherein the seal has a working position provided for sealing the first and second components in which the first and second sealing lips lie supported against one another by the first and second contact surfaces;
wherein the first sealing lip and the second sealing lip have a continuously increasing thickness from the lip base region in the direction towards the respective freely protruding first and second ends; and wherein the second sealing lip has a sealing-lip wing which, in a working position of the seal, forms a pressure surface to which pressure can be applied radially such that a higher pressing force of the sealing lip is applied on an internally lying component.

2. The seal according to claim 1, wherein in the working position, a residual space is provided between the first and second sealing lips in the region between the lip base region and the mutually abutting first and second contact surfaces.

3. The seal according to claim 1, wherein the contact surfaces are disposed in a region of the first sealing lip and the second sealing lip spaced at a distance apart from the lip base region.

4. The seal according to claim 1, wherein the first and second sealing surfaces of the first sealing lip and the second sealing lip, are disposed at an angle of less than 90° relative to one another in the relaxed base position as viewed in cross-section.

5. The seal according to claim 1, wherein the seal has at least one dirt lip, on the side of the lip base region opposite the first sealing lip and the second sealing lip.

6. The seal according to claim 1, wherein the first sealing lip and/or the second sealing lip and/or the lip base region and/or optionally provided dirt lips and/or the sealing-lip wing is or are of an elastically deformable design, at least in some regions but preferably entirely.

7. The seal according to claim 1, wherein the sealing-lip wing is created by providing a recess in an end region of the second sealing lip.

8. The seal according to claim 1, wherein the sealing-lip wing is created by the fact that it protrudes from an end region of the second sealing lip.

9. The seal according to claim 1, wherein in the working position, the first and second sealing lips protrude from the mutually abutting first and second contact surfaces.

10. The seal according to claim 1, wherein in the working position, a pressurizing space is provided between the first and second sealing lips in the region of the freely protruding first and second ends spaced at a distance apart from the lip base region outside the mutually abutting first and second contact surfaces.

11. The seal according to claim 1, wherein the thickness (15) of the first sealing lip continuously decreases again in the outermost end region of the freely protruding end.

12. An assembly comprising:
   (a) a first component;
   (b) a second component; and
   (c) a seal according to claim 1;
   wherein the seal connects the first component to the second component in a connecting position;
   wherein the first component is fully connected to the second component with the seal connected in between the first component and the second component;
   wherein the seal is disposed in its working position in the connecting position of the first and second components;
   wherein the assembly has a released position in which the components are separated from one another; and
   wherein the seal is in its relaxed base position in the released position of the first and second components.

13. A method for sealing a first component to a second component by the seal according to claim 1 in a connecting position in which the first component is fully connected to the second component with the seal connected in between, comprising:
   inserting the seal into one tubular component;
   pushing another tubular component into the seal; and
   transferring the seal from a relaxed base position into a working position.

* * * * *